United States Patent [19]
Figler et al.

[11] 3,944,167
[45] Mar. 16, 1976

[54] RADIATION DETECTION APPARATUS

[75] Inventors: Burton D. Figler, Winthrop; Theodore J. Nussdorfer, Lexington, both of Mass.

[73] Assignee: Sanders Associates, Inc., Nashua, N.H.

[22] Filed: Aug. 24, 1973

[21] Appl. No.: 392,714

[52] U.S. Cl............. 244/3.16; 250/203 R; 250/233; 250/339; 250/342
[51] Int. Cl.......................... F11g 7/00; G01j 1/20
[58] Field of Search........ 250/339, 342, 203 R, 233; 356/141, 152; 244/3.16

[56] References Cited
UNITED STATES PATENTS

| | | | |
|---|---|---|---|
| 2,939,962 | 6/1960 | Miller | 250/203 R |
| 3,023,661 | 3/1962 | McClusky et al. | 250/203 R |
| 3,219,826 | 11/1965 | Letaw, Jr. | 244/3.16 |
| 3,379,891 | 4/1968 | Aroyan | 250/203 R |
| 3,634,689 | 1/1972 | Hachioji-shi et al. | 250/203 R |
| 3,699,345 | 10/1972 | Parkin | 250/203 R |

Primary Examiner—Maynard R. Wilbur
Assistant Examiner—S. C. Buczinski
Attorney, Agent, or Firm—Louis Etlinger; Richard I. Seligman

[57] ABSTRACT

A radiation sensor including an inner detector surrounded by an array of outer detectors is employed in radiation tracking apparatus which is capable of tracking a true target in a field of targets which may include a decoy or false target. The apparatus includes a color filter arrangement and a reticle which cooperates to produce pulses of long and short wavelength filtered infrared radiation upon the outer detectors of the sensor. The apparatus includes means for processing the signals produced by the outer and inner detector elements so as to discriminate between true and false targets and cause the tracking apparatus to track a true target.

17 Claims, 18 Drawing Figures

RADIATION DETECTION APPARATUS

BACKGROUND OF INVENTION

1. Field of Invention

The present invention relates generally to radiant energy responsive apparatus and in particular to infrared radiation homing apparatus and a radiation sensing device useful therein.

Radiation homing or tracking apparatus is useful to track or home in on an optical image of a remote light transmitting object. In one application the object is a missile or aircraft and the transmitted light takes the form of an infrared radiation (hereinafter referred to as IR) pattern emitted from the propulsion system thereof. Since many natural objects and various kinds of machines also emit IR, the tracking apparatus must be capable of discriminating between the radiation pattern of the object being tracked and the IR pattern of the background as well as the IR patterns of undesired or false targets, such as pyrotechnic devices or flares. In addition, the radiation detection apparatus should be capable of operation in a multiple target environment so that it tracks or homes in on a single true target.

2. Prior Art

It is generally known that the IR patterns of a true target, such as a missile, or aircraft and of a false target, such as a flare, have different spectral energy content in different wavelength bands of the spectrum. That is, a flare and an aircraft have different IR color temperatures. Low color temperature targets, such as missiles or aircraft, have their maximum spectral energy emitted at a longer wavelength than higher color temperature targets, such as flare decoys. As a result, many devices are known which discriminate between true and false targets by comparing the differences between the IR intensities in different wavelength bands with one another or with reference intensities.

One type of prior art device includes a separate electro-optical system for each particular color. The IR color intensities produced by each system are balanced with one another to reduce the effect of false target radiation (U.S. Pat. No. 2,927,212) or simply employed to enable or disable (U.S. Pat. Nos. 3,147,381 and 3,219,826) the electro-optical system associated with the true target IR color. The use of a separate optical system for each color is undesirable because the parallel optical systems are bulky and heavy. In addition, these parallel electro-optical systems are not only difficult to align so that the object viewed by each is correspondingly positioned but also difficult to design so that they track with variations in ambient light level and ambient temperature.

In another prior art device, exemplified by U.S. Pat. No. 3,160,751, a single optical system is employed to discriminate between different IR patterns. In this device a number of concentric color filters are employed at the optical entrance aperture to permit preselected and separate IR colors to enter the optical system. A field lens images the entrance aperture and, hence, the filtered IR colors, on a like number of detectors such that separate detectors receive different IR colors. The output voltages of the detectors are then compared to produce an indication or identification of the target from which the IR is emanating. A disadvantage of this device is that it requires a plurality of detectors, one for each IR color being measured. Moreover, this device does not appear to give a valid color identification in a multiple target environment or select and track a single target in such an environment.

BRIEF SUMMARY OF THE INVENTION

An object of the present invention is to provide novel and improved radiant energy responsive apparatus.

Another object is to provide novel and improved IR tracking or homing apparatus which is capable of discriminating between objects having different color temperatures.

Still another object is to provide novel and improved radiant energy tracking apparatus which is capable of tracking and selecting a single target in a multiple target environment.

Yet another object is to provide novel and improved radiation tracking apparatus which is capable of discriminating between color temperatures of different targets in a multiple environment.

A further object is to provide novel and improved radiation tracking apparatus which is capable of discriminating between different color temperature targets as well as selecting and tracking a single target in a multiple target environment.

Still a further object is to provide a novel and improved radiant energy sensing device.

Yet a further object is to provide a novel and improved radiant energy sensing device which can be adapted for tracking and selecting a single target in a multiple target environment.

Briefly, radiant energy responsive apparatus embodying the present invention includes first and second electo-optical devices and a guidance device all arranged to track a field of targets which includes a true target and a false target. The first electro-optical device produces error signals indicative of the deviation from its optical axis of radiant energy emanating from any of the targets which are within its field of view. The guidance device responds to these error signals to home the optical axis on the centroid of the targets until only one target remains in the optical field of view of the first device and then to home the optical axis on the remaining target. The second electro-optical device has a field of view which is centered on the optical axis of and surrounds the field of view of the first electro-optical device. The second device responds to radiant energy emitted by any of the targets which come within its field of view to produce signals which cause the guidance device to reorient the optical axis only when the radiant energy is that of a true target so that it comes within the field of view of the first device.

Radiant energy sensing detector apparatus embodying the invention includes a centrally located detector element which produces a set of signals the amplitudes of which are a function of the position of an image of a target incident thereon. A plurality of separate detector elements surround and are equally spaced from the center of the centrally located detector and are each arranged to produce an output signal in response to the imaging of a point source target thereon.

BRIEF DESCRIPTION OF THE DRAWINGS

In the accompanying drawings like reference characters denote like elements of structure.

DESCRIPTION OF PREFERRED EMBODIMENT

Figure 1:
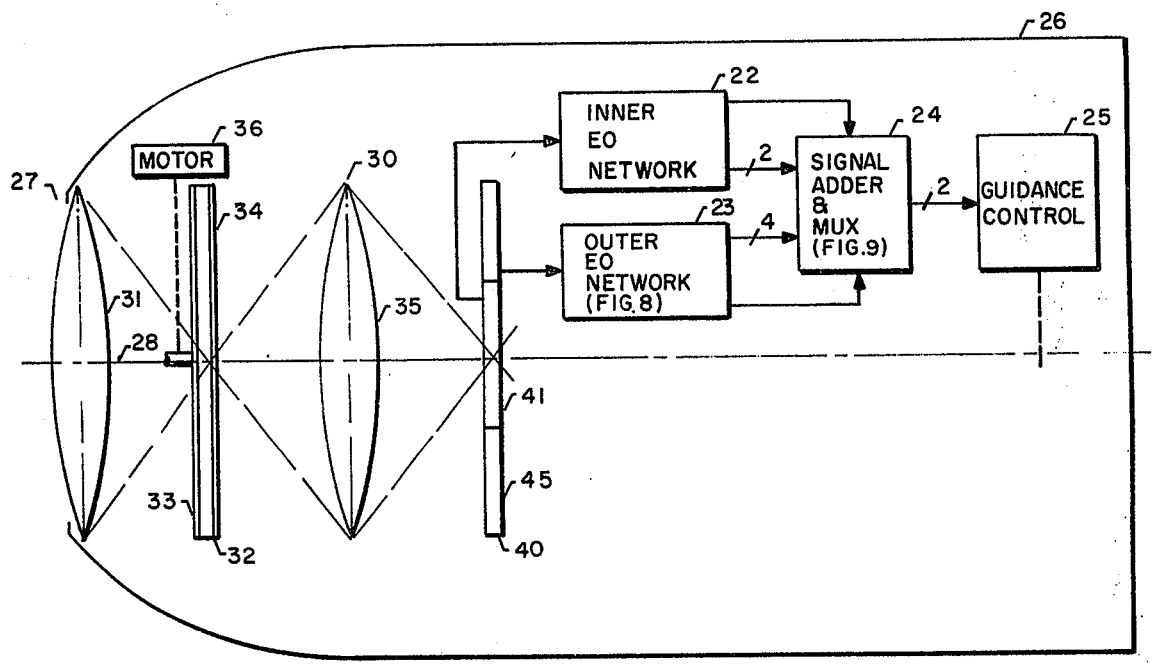
FIG. 1 is a block diagram in part and a side elevational view in part of radiant energy responsive apparatus embodying the present invention.

It is contemplated that radiant energy sensing devices and radiant energy responsive devices embodying the present invention may be employed in any application where it is desired to sense or detect multiple targets and/or to discriminate between targets having different spectral characteristics. However by way of example and completeness of description, radiant energy sensing devices and radiant energy responsive apparatus embodying the invention are illustrated herein in a missile guidance system. As shown in FIG. 1, the guidance system includes an optical system 30, a radiant energy sensing element 40, inner and outer electro-optical networks 22 and 23, a signal adder and multiplexer (MUX)24 and a guidance control unit 25 which are all housed within a missle 26. Radiant energy is admitted through the missile nose aperture 27 and passed by the optical system 30 to the radiant energy sensing element 40. The sensing element 50 converts radiant energy incident upon its surface to electrical energy in the form of output signals. These output signals are processed by the electro-optical networks 22 and 23 and combined in the signal adder and multiplexer 24 to produce error signals $\Delta x$ and $\Delta y$ (azimuth and elevation, respectively) which are indicative of the deviation of a detected target from alignment with the optical axis 28 of the optical system 30 and the detector element 40. The guidance control unit 25 responds to these error signals to change or modify the spatial orientation of the optical axis 28 so as to bring it more closely in alignment with the target.

Since the details of the guidance control unit 25 do not form a part of the present invention, it will not be described in detail herein. Suffice it to say here that such units exist in present day missile guidance systems and that the output error signals provided by the radiant energy responsive apparatus embodying this invention are intended as intput signals to such guidance control units.

The optical system 30 includes a first lens 31 positioned in the missile nose aperture 27 and arranged to focus radiant energy incident on its surface to a disc 32 located in the focal plane of the lens 31. The disc 32 has a reticle pattern 33 fabricated on its surface which faces the lens 31. As shown in the plan view of FIG. 3, the reticle 33 preferably takes the form of a checkerboard pattern of radial sectors or regions 33-1 and 33-2 which are opaque and transparent, respectively, to the incident radiation in the wavelength band of interest. For the purpose of timing as described hereinafter, the opaque region in one area 33-3 of the reticle has been omitted. That is, the area 33-3 of the reticle is transparent to incident radiation in the wavelength of interest. The disc 32 is rotated by means of a motor 36 whereby the checkerboard reticle pattern acts to scan or chop the incident radiation so as to enhance the detection of point source targets such as airplanes or missiles, in the presence of background IR. That is, the spinning reticle 33 with its geometrical scanning pattern acts to spatially filter the radiation collected by the lens 31.

Fabricated on the opposite surface of the disc 32 is a spectral filter arrangement 34. As best seen in the plan view of FIG. 4, the spectral filter arrangement 34 takes the form of a pair of spectral filters 34-1 and 34-2. The filter 34-2 consists of a radial sector the same size as and in registration with the reticle area 33-3. The filter 34-1 covers the remainder of the disc surface. The spectral filter 34-1 is given a passband which substantially matches the wavelength band in which the major portion of the spectral energy radiated by the desired or true target occurs. For the case of an aircraft or missile target this passband is in the infrared region and may extend from 2.8 to 3.2 microns. On the other hand, the spectral filter 34-2 is given a passband which is distinct from that of filter 34-1 and which is chosen in accordance with the spectral energy distribution of unwanted or undesired targets. For example, the radiation from an undesired target such as a flare has a rather high spectral content in the near visible region of the infrared spectrum. Accordingly, as the disc 32 rotates, the incident radiation is not only spatially filtered by the reticle 33 but is also color filtered by the spectral filters 34-1 and 34-2 so as to produce in an outer circumferential annular band defined by the area 33-3 or filter sector 34-2 a relatively short pulse of short wavelength filtered IR and a relatively long pulse of long wavelength filtered IR during each revolution.

The fabrication technique employed to make the reticle 33 does not form any part of the present invention and therefore will not be described herein in detail. Suffice it to say here that any of the reticle fabrication or techniques described in Chapter 9 of the textbook entitled "Reticles and Electro-Optical Devices" by Lucien N. Biberman, 1966, may be employed. The materials for filters 34-1 and 34-2 may be selected from dielectric semiconductor materials, such as zinc sulphide, which are deposited in a suitable substrate such as quartz by standard deposition techniques. The motor 36 preferably takes the form of a hysteresis synchronous motor with a belt drive linkage to the shaft of the disc 32.

The spatially and spectrally filtered IR is again nearly focused by means of another lens 35 onto the detector element 40 which is located just out of the focal plane of the lens 34. The image is deliberately defocused a small amount in order to avoid a dead zone in the detector transfer function as the image traverses the central electrode 41-5. For simplicity of illustration, detector element 40 is shown in skeletal form in FIG. 1 as consisting of an inner detector 41 and an outer detector 45 which is concentric with the inner detector 41 and which is in optical registration with the circumferential band of short and long wavelength filtered radiation produced by the spectral filters 34-1 and 34-2.

Figure 5:
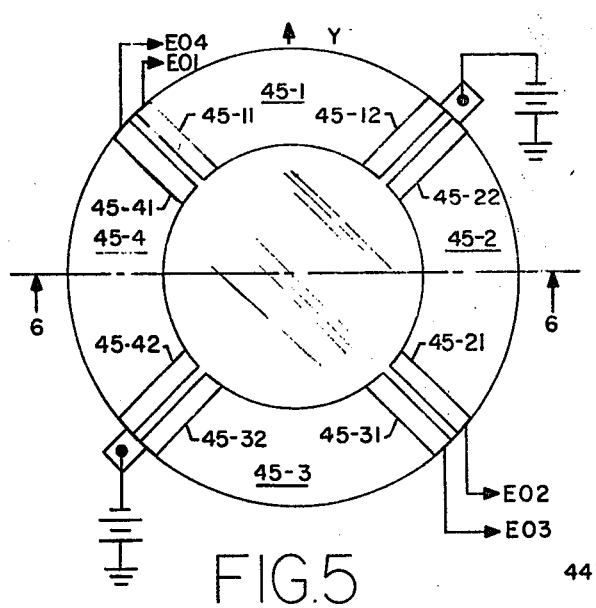
FIG. 5 is a plan view of one surface of a radiation sensing element embodying the present invention.
Figure 7:
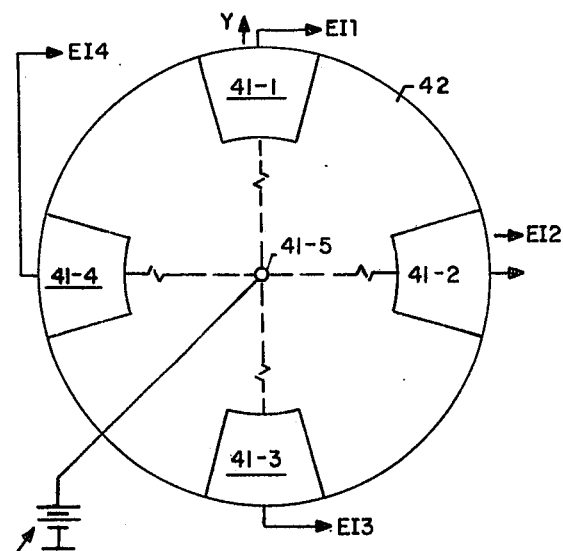
FIG. 7 is a plan view of the other surface of the radiation sensing element of FIG. 5.
Figure 6:
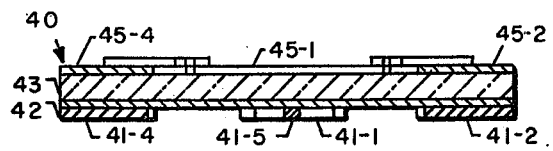
FIG. 6 is a sectional view taken along the lines 6—6 of the radiation sensing element shown in FIG. 5.

The inner and outer detector elements 41 and 45 preferably take the form of a unitary or one piece construction as shown in FIGS. 5 to 7. The inner detector 41 (FIG. 7) takes the form of a five electrode variable impedance lead sulfide (PbS) detector of the type described at column 7 of U.S. Pat. No. 3,657,548. Thus, a circular layer of lead sulfide material 42 is deposited on one surface of a substrate 43 which consists of a material, such as quartz, which is transparent to IR. A d.c. bias source, illustrated as a battery 44, applies a d.c. bias to a center electrode 41-5 adhered to the external surface of layer 42. The other four electrodes 41-1 to 41-4 take the form of radial sectors located at 90° intervals about the periphery of the layer 42. The radial length of each outer electrode sector is equal to the radial length of the filter 34-2 whereby the active area of detector 41 consists of the inner circular region defined by the outer electrodes. The dashed connections of resistors between the center electrode 41-5 and each of the outer electrodes 41-1 to 41-4 diagrammatically illustrate the approximate equivalent circuit.

The output signals EI1 and EI4 produced by the detector 41 at electrodes 41-1 through 41-4, respectively, are functions of the position or location of the detector surface where the optical system 30 focuses an image of a radiating point source target. The center (electrode 41-5) of the detector 41 coincides with the optical axis. When a slightly defocussed point source target image modulated by the reticle scanner 33 lands on the detector center electrode 41-5, positive going signals of equal amplitude are produced on the output leads connected to each of the output electrodes 41-1 to 41-4. These equal amplitude signals are balanced or nulled in the inner electro-optical network 22 to produce a target on axis or on boresight condition. If the radiation pulse lands at another point on the detector surface, the amplitudes of the positive going signals produced at the output electrodes will be functions of the displacement from the cell center. These signal amplitudes are then compared with one another in network 22 so as to produce signals indicative of the amount and direction of displacement from the cell center. The actual comparisons made are dependent upon the definition of elevation and azimuth with respect to the orientation of the cell 41. For the illustrated embodiment, the elevation and azimuth direction are considered as the vertical and horizontal, respectively, illustrated by the Y and X coordinate axes which are superimposed upon the cell 41 with the origin coinciding with the cell center. For such a definition, it can be determined if a target is either on or to the right or left of the Y axis by comparing the signals at electrodes 41-2 and 41-4. Similarly, it can be determined if the target is either on or above or below the X axis by comparing the signals from electrodes 41-1 and 41-3. The results of these comparisons are then employed to generate the inner detector error signals $\Delta x_I$ and $\Delta y_I$ indicative of the amount of displacement of the target image from the X and Y axes, respectively.

These error signals are applied via the signal adder and MUX 24 to the guidance control 25 which responds thereto to orient the optical axis in a direction to bring the missile on to boresight.

Figure 2A:
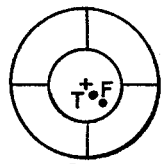
FIGS. 2a to 2f are a sequence of plan views of the radiant energy sensing element of the FIG. 1 apparatus showing an exemplary sequence of events for discriminating between a true and a false target.
Figure 2B:
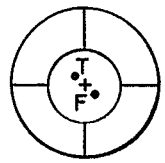
Figure 2C:
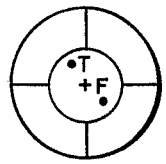
Figure 2D:
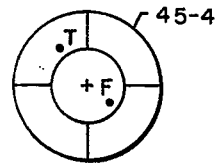
Figure 2E:
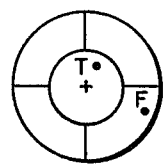
Figure 2F:
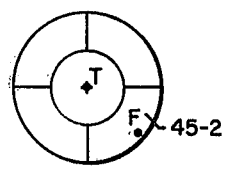

As shown in FIGS. 5 and 6, the outer detector 45 consists of four 90° radial sectors 45-1 to 45-4 of lead sulfide material arranged about the periphery of and on the opposite side of the substrate 43 so as to be responsive to the aforementioned outer band of spectrally filtered IR. To this end the sectors 45-1 to 45-4 have the same radial length as sectors 33-3, 34-2 and 41-1 to 41-4 and are arranged in optical registration therewith. The sectors 45-1 to 45-4 subtend annular radial sectors about the +Y, +X, −Y and −X directions, respectively. As a result, when a point source target is focused on any one of the sectors 45-1 to 45-4 an output signal EO1, EO2, EO3, or EO4, is produced on the corresponding output electrodes 45-11, 45-21, 45-31 or 45-41, as the case may be. For example, the output signal EO1 indicates that a target is present on the outer detector element 45-1 and that its displacement from boresight is in the +Y direction. The output electrodes 45-11, 45-21, 45-31 and 45-41 are located at one end of their corresponding sectors while corresponding electrodes 45-12, 45-22, 45-32 and 45-42 are located at the other ends of the sectors and are connected to bias sources The inner and outer detectors 41 and 45 operate as follows to seek a true target in a multitarget environment in which one or more true target aircraft emit a false target flare as a countermeasure. As the missile approaches a field of targets the inner detector 41 is operable to track the centroid of the IR energy emitted by the targets. That is, the signals EI1 to EI4 are indicative of the centroid location for a plurality of targets within its optical field of view (the inner circular region defined by electrodes 41-1 to 41-4). If one of the aircraft targets T in FIG. 2a deploys a flare decoy F the centroid is nearer to the flare due to its higher color temperature. As the missile approaches the flare and aircraft the flare F and aircraft T targets separate (FIGS. 2b–2d) until T target leaves the field of view of the inner detector 41 (FIG. 2d). As the T target or aircraft enters the field of view of the outer detector 45 and is focused on to the outer detector element 45-4, the signal EO4 is produced. Due to the spectral filtering produced by filters 34-1 and 34-2 (FIGS. 1 and 4) the signal EO4 consists of a short portion of a first amplitude and a longer portion of a second amplitude during each revolution of the disk 32. The second electro-optical network 23 discriminates between the amplitudes (color temperatures) of these two amplitude values to determine that the aircraft is a true target and issues a correction signal $\Delta x_o$ which causes the guidance control 25 to reorient the optical axis so that the aircraft or true target T again comes within the field of view of the inner detector 41 (FIG. 2e). When the flare is detected by the outer detector element 45-2 the second electro-optical network 23 determines that it is a false target so as to produce signals which command the guidance control 25 to respond only to the error signals $\Delta x_I$ and $\Delta y_I$ produced by the inner detector 41. As a result, the inner detector 41 continues to track the aircraft and the outer detector ignores the flare which eventually leaves the outer detector field of view as the missile comes nearer to the aircraft.

For the case where none of the aircraft in the optical field of view of the detector element 41 and 45 deploys a flare, the inner detector 41 tracks the centroid of the emitted IR. As the missile approaches and a first one of the aircraft leaves the inner detector field of view and enters the outer detector field of view the outer detector 45 produces an appropriate output signal EO1 to EO4, as the case may be. This signal causes the electro-optical network 23 to produce a corresponding $\Delta x_o$ or $\Delta y_o$ signal to cause the guidance control to reorient the optical axis by one-half the field of view of the inner detector. The result is that the IR centroid tracked by the inner detector 41 is close to the first aircraft and that some of the other aircraft may be driven from the field of view of both detectors. As further ones of the aircraft leave the inner detector field of view, the same process is repeated until only one target is within the inner detector field of view and no targets are within the outer detector field of view.

The outer detector also performs a gross or coarse positioning operation. With no target images present on the inner detector 41, one or more target images appearing on the outer detector 45 causes the second electro-optical network to produce coarse positioning signals $\Delta x_c$ and $\Delta y_c$. These signals are applied to the guidance control 25 via the signal adder and MUX 24 to reorient the optical axis by one half the field of view of the inner detector so that the target images are incident on the inner detector surface. The target tracking process described above then begins.

Figure 8:
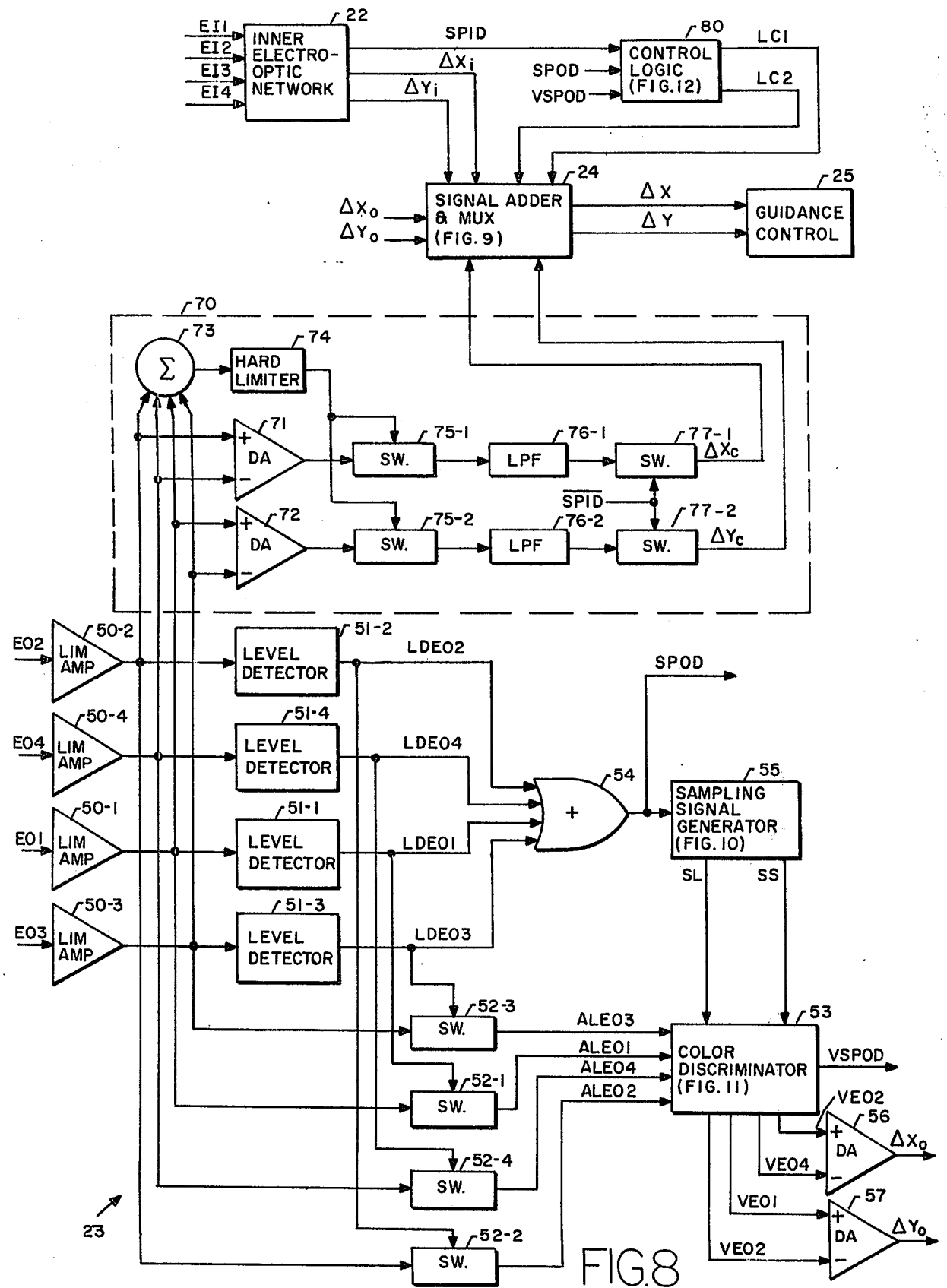
FIG. 8 is a more detailed block diagram of radiant energy responsive apparatus embodying the present invention.

With reference now to FIG. 8, the inner electro-optic network 22 is shown as receiving the output signals EI1 to through EI4 from the inner detector 41 so as to produce not only the error signals $\Delta x_i$ and $\Delta y_i$ but also a control signal which is indicative of a signal present on the inner detector (SPID). The inner electro-optic network 22 may include any suitable circuits for generating the $\Delta x_i$ and $\Delta y_i$ error signals. For example, network 22 may include circuits substantially identical to those shown in FIG. 4 of our copending application entitled "Radiation Detection Apparatus", filed concurrently herewith, provided that the sampling signal generator shown in FIG. 10 of this application is employed. In addition, the inner electro-optic network 22 includes a summing circuit which takes the sum of the signals EI1 through EI4 to produce the SPID signal.

With the exception of the signal adder and MUX 24 and the guidance control 25, the outer electro-optic network 23 includes the remainder of the block shown in FIG. 8. The network 23 includes a plurality of limiting amplifiers 50-1 through 50-4 which serve to amplify and limit the outer detector output signals EO1 through EO4, respectively. After amplification and limiting in the devices 50-1 through 50-4 the signals EO1 through EO4 are applied both to level detectors 51-1 through 51-4 and to switches 52-1 through 52-4, respectively. Level detectors 51-1 through 51-4 produce output signals LDE01 to LDE04 only when the amplitudes of the corresponding input signals exceed a threshold level which is set to be less than the signal level normally expected by a point source true target. The output signals of the level detectors 51-1 through 51-4 are coupled so as to enable the switches 52-1 through 52-4 to pass the amplified and limited signals EO1 through EO4 as signals ALE01 to ALE04, respectively, to a color discriminator 53 only when the corresponding input signals exceed the threshold level. In addition, the output signals of the level detectors 51-1 through 51-4 are combined in an OR network 54 so as to produce a signal indicative of a target on the outer detector (SPOD).

Figure 3:
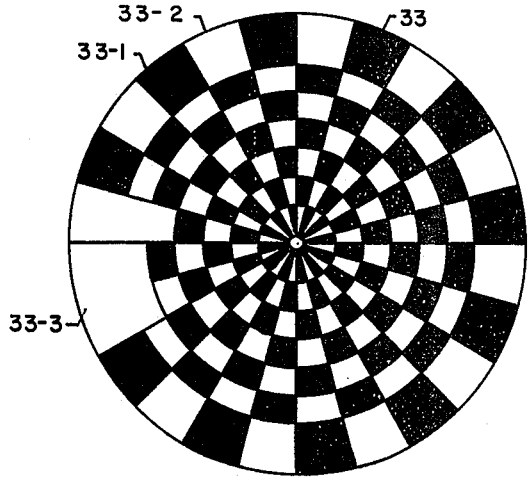
FIG. 3 is a plan view of the reticle carrying surface of the spinning disc included in the radiant energy responsive apparatus of FIG. 1.

The SPOD signal is also applied to a sampling signal generator 55 which responds thereto to produce a long wavelength sampling signal $S_1$ and a short wavelength signal $S_s$ once each revolution of the reticle 33 (FIGS. 1 and 3). A color discriminator 53 uses the sampling signals $S_1$ and $S_s$ during each reticle revolution to take a long and short wavelength filtered signal sample of the outer detector signals ALE01 to ALE04 which appear at the outputs of the switches 52-1 to 52-4, respectively. The color discriminator 53 then compares the two signal samples taken during each reticle revolution to produce a signal indicative of a valid target present on the outer detector (VSPOD) and a set of signals VE01 to VE04 which are indicative of valid signals present on the outer detectors 45-1 to 45-4 (FIG. 5), respectively. The signals VE02 and VE04 are applied to the plus and minus inputs of the differential amplifier 56 which produces at its output the outer detector error signal $\Delta x_o$. The VE01 and VE03 signals are applied to the plus and minus inputs of another differential amplifier 57 which produces at its output the outer detector error signal $\Delta y_o$.

The limited and amplified signals ALE01 to ALE04 are also applied to a coarse positioning network 70 which is operable to produce the coarse positioning error signals $\Delta x_c$ and $\Delta y_c$ only when there is no signal present on the inner detector 41 (FIG. 1). Network 70 includes a first differential amplifier 71 which receives at its plus and minus inputs the EO2 and EO4 outer detector signals and a second differential amplifier 72 which receives at its plus and minus inputs the EO1 and EO3 outer detector signals. The signals at the outputs of the amplifiers 71 and 72 are, hence, indicative of x or azimuth and y or elevation information, respectively. The output signal produced by the amplifier 71 is coupled in a series path including a switch 75-1, a low pass filter 76-1 and another switch 77-1 to produce the $\Delta x_c$ signal. On the other hand, the output signal from the amplifier 72 is coupled in another series path which includes the switch 75-2, a low-pass filter 76-2 and a further switch 77-2 to produce the $\Delta y_c$ signal. The switches 75-1 and 75-2 are closed or enabled only when there is a signal present on the outer detector. To this end, network 70 includes a summing network 73 which receives all of the signals EO1 through EO4 so as to produce at its output a signal representative of the sum thereof. This signal is hard limited by a hard limiter device 74 and applied as the open and close control for switches 75-1 and 75-2. The low pass filters 76-1 and 76-2 serve to demodulate the detector signals and produce a d.c. level indicative of signal strength. The switches 77-1 and 77-2 are enabled only when there is no signal present on the inner detector 41. To this end, the signal $\overline{\text{SPID}}$ is applied to the open and close control of the switches 77-1 and 77-2. The signal $\overline{\text{SPID}}$ is merely the complement of SPID and is derived therefrom by means of an inverter included in a logic control 80.

The SPID, SPOD and VSPOD signals are processed by the control logic network 80 so as to produce a pair of multiplex control signals LC1 and LC2. The multiplex control signals LC1 and LC2 control the signal adder and MUX 24 to multiplex the inner detector ($\Delta x_i$ and $\Delta y_i$), outer detector ($\Delta x_o$ and $\Delta y_o$) and the coarse positioning ($\Delta x_c$ and $\Delta y_c$) error signals to the guidance control 25.

Figure 9:
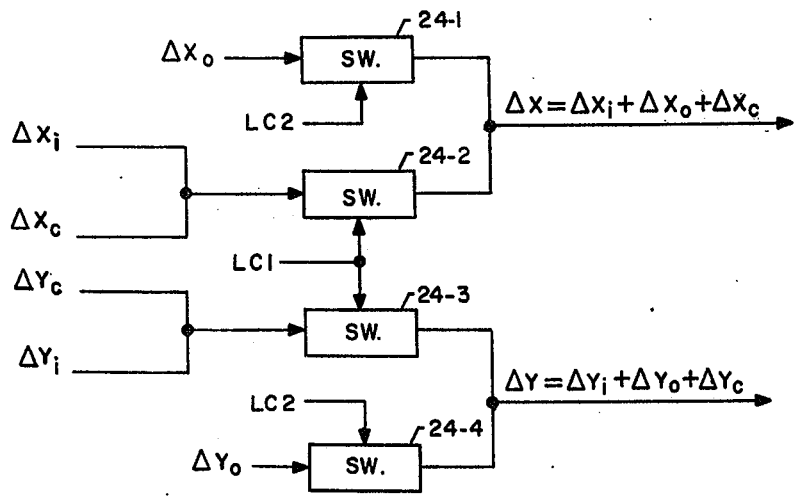
FIG. 9 is a block diagram of the signal adder and multiplexer employed in the radiant energy responsive apparatus.

As shown in FIG. 9, the signal adder and MUX 24 includes four switching elements 24-1 through 24-4. The switching devices 24-1 and 24-4 are arranged to couple the $\Delta x_o$ and $\Delta y_o$ signal to the $\Delta x$ and $\Delta y$ output leads, respectively, under the control of the LC2 multiplex control signal. The LC2 signal is true so as to close switches 24-1 and 24-4 when there is a signal present in the outer detector 45 (SPOD true) and no signal present on the inner detector 41 (SPID false) or when there is a valid signal (VSPOD true) and (SPOD true) on the outer detector 45 and simultaneously signal present on the inner detector 41, (SPID true). The $LC_I$ signal is true whenever there is a signal present on the inner detector 41 (SPID true) except if there is a valid signal on the outer detector 45 (both SPOD and VSPOD true). This is set forth clearly in the truth table below.

| TRUTH TABLE | | | | |
|---|---|---|---|---|
| | INPUT | | OUTPUT | |
| SPID | SPOD | VSPOD | LC1 | LC2 |
| 0 | 1 | 1 | 0 | 1 |
| 0 | 1 | 0 | 0 | 1 |
| 0 | 0 | 1 | 0 | 0 |
| 0 | 0 | 0 | 0 | 0 |
| 1 | 0 | 1 | 1 | 0 |
| 1 | 0 | 0 | 1 | 0 |
| 1 | 1 | 1 | 0 | 1 |
| 1 | 1 | 0 | 1 | 0 |

Figure 12:
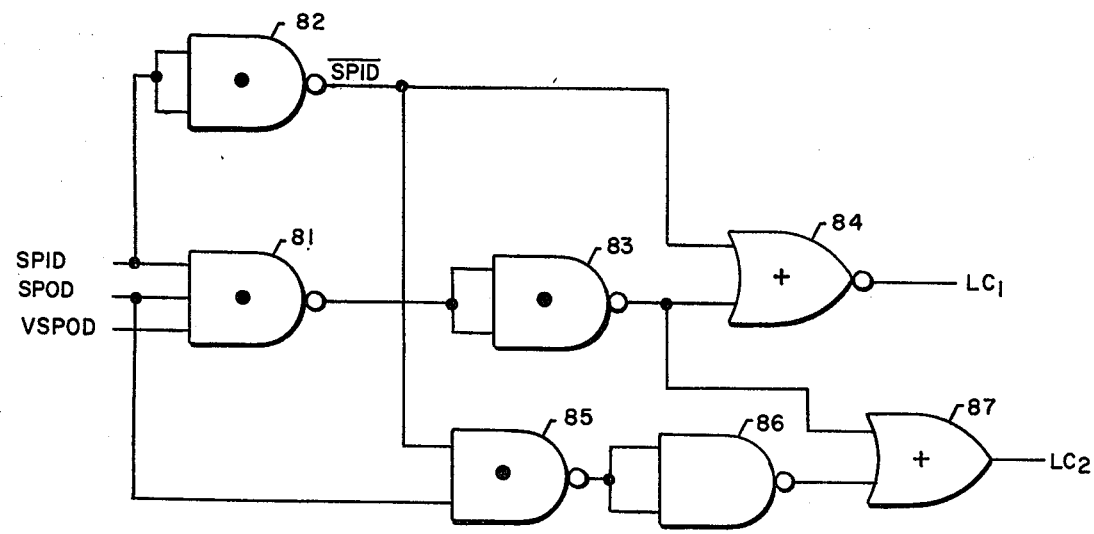
FIG. 12 is a logic schematic diagram of the control logic block of the radiant energy sensing apparatus.

One exemplary implementation of the truth table is shown in FIG. 12 to include a three input NAND network 81 which receives SPID, SPOD and VSPOD at its inputs. A first invertor 82, shown as a two input NAND gate with its inputs connected together, is used to derive the $\overline{SPID}$ signal. A second inverter 82 inverts the output of gate 81 before application to a NOR gate 84. The other input to gate 84 is the $\overline{SPID}$ signal. The output of gate 84 is the LC1 signal. A NAND gate 85 is used to detect the coincidence of $\overline{SPID}$ and SPOD. The output of gate 85 is inverted by another inverter 86 before application to an OR gate 87. The OR gate 87 receives the output of inverter 83 and produces the signal LC2. The operation of this circuit is completely described by the Truth Table.

Figure 10:
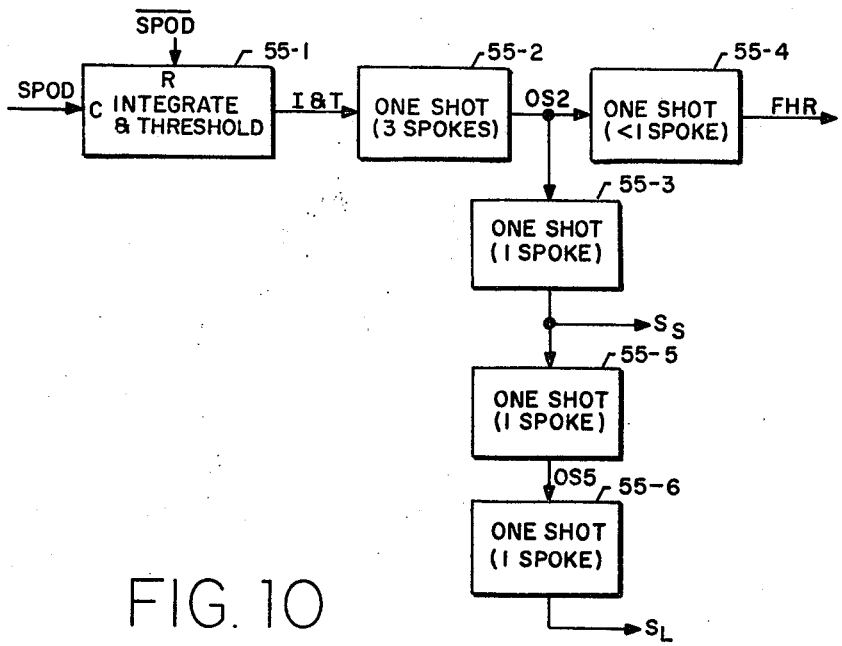
FIG. 10 is a block diagram of a sampling signal generator useful in the radiant energy responsive apparatus.
Figure 13:
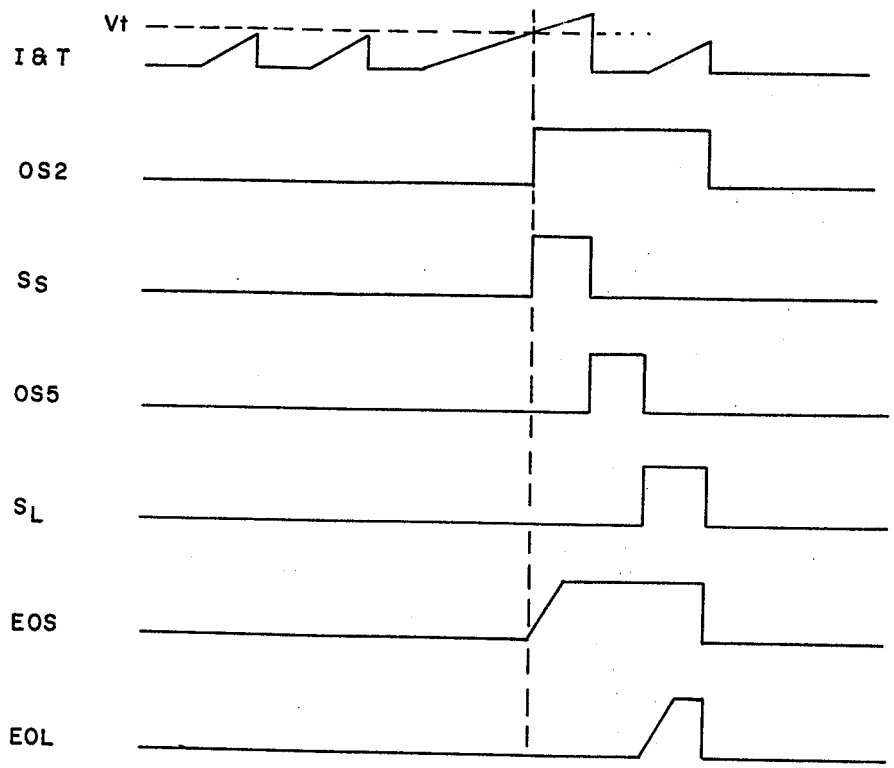
FIG. 13 is a waveform diagram of signals which occur at various points in the circuits of FIGS. 10 and 11.

With reference now to FIG. 10 and to the waveform diagram of FIG. 13 which shows the waveforms of the signals occurring at various points and of the circuit at FIG. 10, the sampling signal generator 55 is shown to include an integrator and threshold device 55-1 which is operable to integrate the SPOD signal. As shown in the waveform diagram of FIG. 13, the SPOD signal is a squarewave having a period equal to the time required for two of the radial spoke sectors 33-1 and 33-2 (FIG. 3) to sweep past the point source target image which is present on one of the outer detector elements 45-1 to 45-4 (FIG. 5). However, the SPOD squarewave is interrupted once per reticle revolution as the wholly transparent (to IR) area 33-3 sweeps past the point source target image. This interruption is equal to one squarewave period or two radial spoke sectors.

The integrated and threshold network 55-1 remits an output signal I & T only when the integrated SPOD signal exceeds a threshold voltage $V_t$. As shown in FIG. 13 this occurs only once per reticle revolution when the reticle area 33-3 sweeps past the target image. The integrate and threshold network 55-1 is reset by the complement signal $\overline{SPOD}$.

The I & T signal causes a first one-shot multivibrator 55-2 to fire so as to produce an output signal OS2 which has a duration equal to the time required for three radial spoke sectors to sweep past the target image. The leading edge of the OS2 signal causes another one-shot 55-3 to fire to produce the short wavelength sampling signal $S_s$ which has a duration of one spoke period. The trailing edge of the $S_s$ signal causes another one-shot 55-5 to fire which produces an output signal OS5 having a duration of one spoke period. The trailing edge of the OS5 signal then causes a further one-shot 55-6 to fire so as to produce a long wavelength sampling signal $S_L$ having a duration of one spoke period. Finally, a further one-shot 55-4 responds to the trailing edge of the signal OS2 to produce an output signal FHR (not shown in FIG. 13) having a duration of long enough to reset the follow and hold circuits (less than 1 spoke). The FHR signal is employed in the color discriminator 53.

Figure 11:
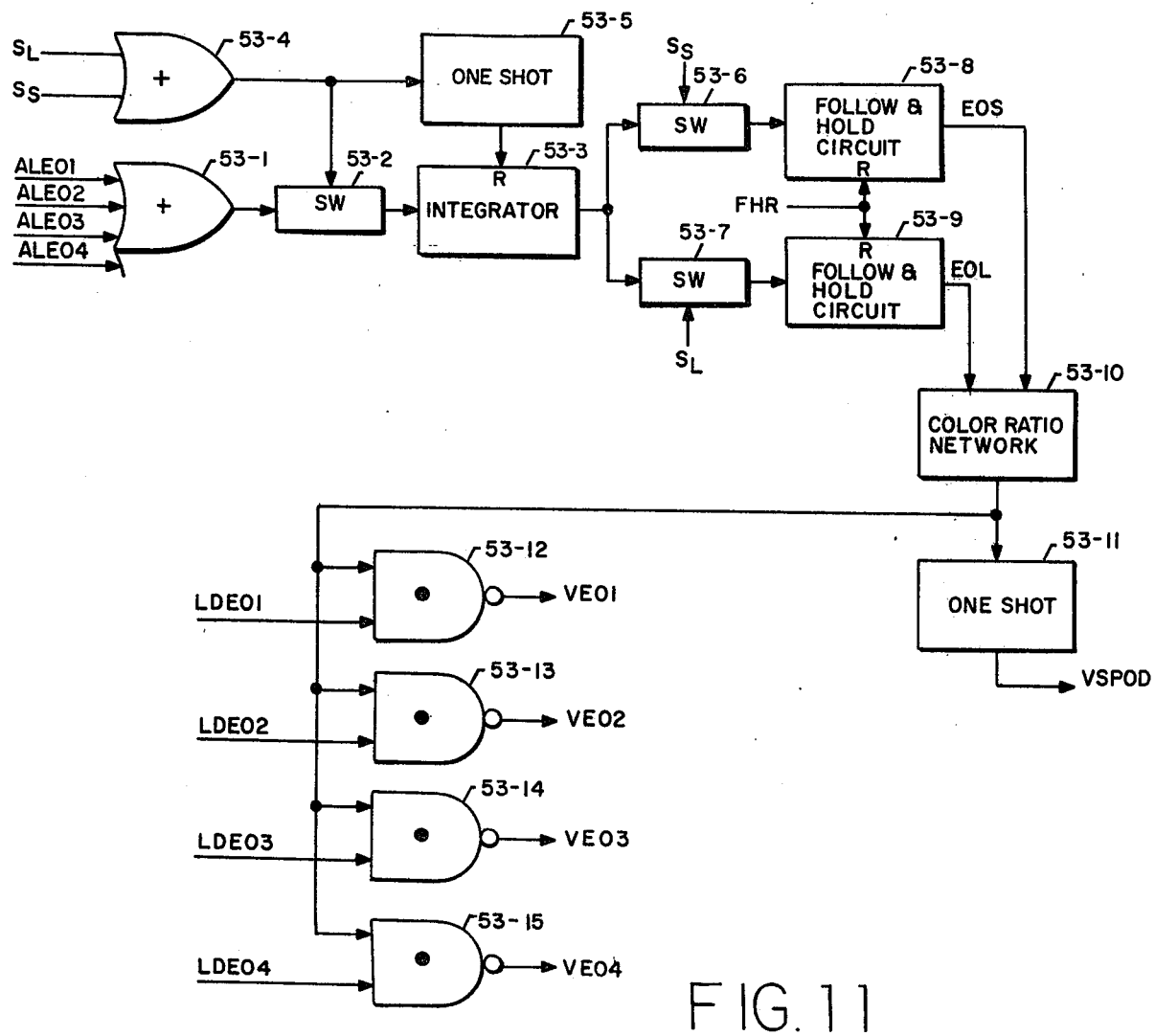
FIG. 11 is a block diagram of a color discriminator network which is also useful in the radiant energy responsive apparatus.

Although the color discriminator network 53 may take the form of the network of color discriminator described in our aforementioned copending application, it is preferably of the type shown in FIG. 11 which can be time shared by the various outer detector elements 45-1 to 45-4. As shown in FIG. 11, the ALE01 to ALE04 signals are combined in an OR network 53-1, the output of which is coupled via a switch 53-2 to an integrator 53-3. The switch 53-2 is enabled or closed only during the short and long wavelength sampling periods. To this end, the $S_1$ and $S_s$ sampling signal are applied via an OR gate 53-4 to the control or enabling input of the switch 53-2. The trailing edge of the output of the OR gate 53-4 causes a one-shot 53-5 to fire so as to produce a signal having a duration short compared to a spoke period. This output signal of one-shot 53-5 is applied to the reset R input of the integrator 53-3. The integrator 53-3 is then operable during each reticle revolution to intergrate both the short wavelength signal sample and the long wavelength signal sample occurring in sequence at the output of switch 53-2. The output of the integrator 53-3 then comprises a sequence of the short and long wavelength signal samples having amplitude values which are proportional to the IR intensity of the point source target in the short and long wavelength bands, respectively.

The output signal of the integrator 53-3 is then applied via switches 53-6 and 53-7 to the inputs of follow and hold circuits 53-8 and 53-9, respectively. The switches 53-6 and 53-7 are enabled by the $S_s$ and $S_1$ sampling signals, respectively, to pass the short and long wavelength signal samples to the corresponding follow and hold circuits. Each of the follow and hold circuits is operable to follow and hold the peak amplitude value of the signal sample supplied to it by the corresponding switch 53-6 and 53-7 until it is reset by the trailing edge of the FHR signal (see FIG. 10). The output signals of EOS and EOL of the follow and hold circuits 53-8 and 53-9 are also shown in waveform diagram of FIG. 13.

Figure 4:
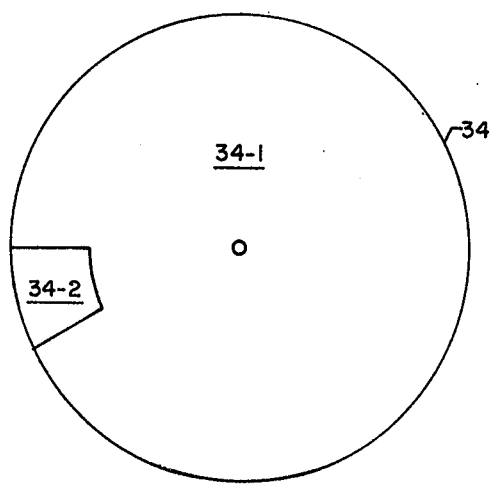
FIG. 4 is a plan view of the other surface of the spinning disc showing the location of the IR color filters.

The EOS and EOL sampled signals are then applied to a color ratio network 53-10 which may suitably take the form of the color ratio network shown in FIG. 4 of our aforementioned copending application. Suffice it to say here that the color ratio network 53-10 emits an output signal only when the signal amplitudes of the EOS and EOL signal are such that the point source target image is a true or valid target. This output signal is employed to fire a one-shot 53-11, the output of which is the VSPOD signal. The output of color ratio network 53-10 is also employed to enable a set of two input NAND gates 53-12 to 53-15. When so enabled, the gates 53-12 to 53-15 pass the LDEO1 to LDEO4 signals applied to their other respective inputs to produce at their inputs the VEO1 to VEO4 signals, respectively.

The various circuit blocks shown in the various drawings are all well known circuits and do not form any part of the invention. Accordingly, they are not described in detail herein. The various logic gates, one-shot multivibrators, may be selected from the Texas Instruments TTL catalog. The switches shown throughout the drawings may be any suitable analog switch, such as a field effect transistor available from Signetics. The differential amplifiers, limiting amplifiers, summing networks and level detectors may be implemented with operational amplifiers such as the $\mu$A741, available from Fairchild Semiconductor Corporation. For differential amplifier operation both the inverting and noninverting operational amplifier inputs are employed. For a limiter amplifier, a diode is placed in the feedback loop. For a summing amplifier, a resistor summing network is employed at the operational amplifier input. For level detector operation, the operational amplifier is operated as a Schmitt trigger device. The integrator 53-3 and the integrate and threshold network 55-1 may suitably take on the form of an operational amplifier with capacitor feedback and of operational amplifiers connected as Schmitt triggers. The follow and hold circuits may take the form of the MP 255 sample and hold module available from Analogic Corporation, Wakefield, Mass.

What is claimed is:

1. Radiant energy sensing apparatus comprising:
    a spectral filter including first and second spectral bandpass portions which pass radiations of long and relatively short wavelength, respectively
    a centrally located detector element arranged to receive radiation passing through said first spectral bandpass portion of said spectral filter and which produces a set of signals, the amplitudes of which are a function of the position of an image of a point source target incident thereon; and
    a plurality of separate detectors arranged to receive radiation passing through said first and second spectral bandpass portions of said spectral filter surrounding and equally spaced from the center of the centrally located detector and each arranged to produce an output signal in response to the imaging of a point source target thereon, said output signal having a particular characteristic depending on the spectral content of the point source target.

2. Radiant energy sensing apparatus as set forth in claim 1
    wherein the centrally located detector element has a substantially planar surface with a bias electrode located centrally thereon and four output electrodes also located thereon in spaced apart relation about the periphery of the surface.

3. Radiant energy sensing apparatus as set forth in claim 2
    wherein each of said separate detectors has a planar surface with a bias electrode and an output electrode located thereon in spaced apart relation.

4. Radiant energy sensing apparatus as set forth in claim 3
    wherein the planar surface of the centrally located detector element is substantially circular in shape; and
    wherein each of the separate detectors comprises an annular segment of an annular band surrounding the centrally located detector element.

5. Radiant energy sensing apparatus as set forth in claim 4 wherein said plurality is four.

6. Radiation detector apparatus comprising
    an optical device for collecting incident radiations;
    a filter for filtering the collected radiations;
    a detector element for converting the filtered radiations into an electrical signal;
    said filter including
    a revolving disc having a reticle pattern on one planar surface thereof for spatially filtering the collected radiations, said reticle pattern comprising a substantially uniform array of opaque and transparent areas with the exception that at least one opaque area of the uniform array pattern being transparent in one region of the disc planar surface;
    first and second bandpass filters disposed on the opposite planar surface of the disc for passing radiations of long and relatively short wavelengths, respectively, one of said spectral filters having the same shape as and being in registration with said one region and the other spectral filter covering the remainder of said opposite disc surface, said detector element being so located that the detector element receives filtered radiation from the first and second filters;
    means responsive to said electrical signal to produce first and second coupling sampling signals during revolution of said reticle; and
    means responsive to the first and second sampling signals to convert the electrical signal produced by the detector element into first and second sequences of signal samples indicative of long and short wavelength filtered radiation, respectively.

7. Radiation detection apparatus as set forth in claim 6 and further including
    means for comparing the first and second sequences of signal samples with one another to produce a comparison signal; and
    means for producing a target signal when the amplitude of the comparison signal at least equals a predetermined value.

8. Radiation detection apparatus as set forth in claim 7 wherein the sampling signal producing means includes
    a limiter for limiting the electrical signal;
    an integrator for integrating the limited electrical signal, said integrated signal exceeding a first amplitude value only once each disc revolution corresponding to the passage of said one region over the detector element; and
    a level detector circuit responsive to said integrated signal exceeding said first amplitude value for sequentially producing said first and second sampling signals during revolution of said reticle.

9. Radiation homing apparatus for tracking a field of targets which includes a true target and a false target, said apparatus comprising
    an optical device for collecting incident radiations;
    a filter for filtering the collected radiations;
    a first centrally located detector having a field of view centered on the optical axis of said optical device and producing first output signals indicative of the location of a target image upon its surface;

means responsive to said first output signals to produce error signals indicative of the deviation from the optical axis of radiation emanating from any of the targets within the field of view of the first detector;

a guidance device responsive to said error signals to home said optical axis on the centroid of the targets until only one target remains in the optical field of view of the first detector and then to home the optical axis on the remaining target;

a second detector means having a field of view centered on said optical axis and surrounding the field of view of the first detector and producing second output signals in response to incident radiation from any of said targets which come within its field of view;

said filter including a revolving disc having a reticle pattern on one surface thereof for spatially filtering the collected radiations;

first and second bandpass spectral filters on another surface of the disc which pass radiations of long and relatively short wavelength, respectively, in the optical field of view of the second detector; and means responsive to said second output signals to produce correction signals which cause the guidance device to reorient the optical axis only when the radiation is that of the true target so that it comes within the field of view of the first detector.

10. Radiation homing apparatus as set forth in claim 9 wherein said correction signal producing means includes means responsive to said second output signals to produce first and second sampling signals during the first and second revolution portions, respectively, and means responsive to the first and second sampling signals to convert the second output signals into first and second sequences of signal samples indicative of long and short wavelength filtered radiation, respectively;

means for comparing the first and second sequences of signal samples with one another to produce a comparison signal; and means for producing a target signal when the amplitude of the comparison signal at least equals a predetermined value whereby the target signal corresponds to said correction signal.

11. Radiation homing apparatus as set forth in claim 10 wherein the sampling signal producing means includes a limiter for limiting the electrical signal;

an integrator for integrating the limited electrical signal, said integrated signal exceeding a first amplitude value only once each disc revolution corresponding to the passage of said one region over the detector element; and a level detector circuit reponsive to said integrated signal exceeding said first amplitude value for sequentially producing said first and second sampling signals during revolution of said reticle.

12. Radiation homing apparatus as set forth in claim 11 wherein said reticle pattern comprises an array of opaque and transparent areas with at least one opaque area omitted in one region of the disc surface; and wherein one of said spectral filters has the same shape as and is in registration with said one region on the opposite surface of the disc and the other spectral filter covers the remainder of said opposite disc surface, said second detector element being so located that it receives the filtered radiation from the first and second filters.

13. Radiation homing apparatus as set forth in claim 12 wherein said second detector means comprises a plurality of separate detectors surrounding and equally spaced from the center of the located detector and each arranged to produce one of said second output signals in response to the imaging of a point source target thereon.

14. Radiation homing apparatus as set forth in claim 13 wherein the first detector element has a substantially planar surface with a bias electrode located centrally thereon and four output electrodes also located thereon at spaced apart relation about the periphery of the surface.

15. Radiation homing apparatus as set forth in claim 14 wherein each of said second detector elements has a planar surface with a bias electrode or an output electrode located thereon in spaced apart relation.

16. Radiation homing apparatus as set forth in claim 15 wherein the planar surface of the first detector element is substantially circular in shape; and wherein each of the second detector elements comprises an annular segment of an annular band surrounding the first detector element.

17. Radiation homing apparatus as set forth in claim 16 wherein said plurality of second detector elements is four.

* * * * *